3,278,576
METHOD FOR REACTING HYDROGEN CYANIDE WITH OLEFINS
Darwin Darrell Davis, Orange, Tex., assignor to E. I. du Pont de Nemours and Company, Wilmington, Del., a corporation of Delaware
No Drawing. Filed Oct. 23, 1963, Ser. No. 318,202
4 Claims. (Cl. 260—465.3)

This invention relates to the catalytic addition of hydrogen cyanide to olefins to yield organic nitriles.

It has been known that hydrogen cyanide could be added to carbon-carbon triple bonds to yield alpha beta unsaturated nitriles, and to compounds with activated double bonds such as the carbonyl group, carbon to carbon double bonds adjacent to carbonyl nitrile or like polar groupings, and the like. It has also been known to add hydrogen cyanide to conjugated unsaturated systems. Organic compounds containing isolated i.e., non-conjugated, inactivated double bonds such as ethylene and its homologues react with hydrogen cyanide only with considerable difficulty. Thus, Teter, U.S. Patent 2,385,741 teaches reacting olefins with anhydrous hydrogen cyanide in the presence of metallic cobalt or copper catalysts at temperatures of from 400° C. to 750° C. or higher. The greatest yield of nitrile, based on the olefin charged was 3.49% at a temperature of 750° C., using an excess of hydrogen cyanide.

It has now been discovered that hydrogen cyanide may be added to lower molecular weight aliphatic olefins, and particularly ethylene, with substantial degrees of conversion and substantially quantitative yield based on either the hydrogen cyanide or the olefin, by passing a mixture of ethylene and hydrogen cyanide over a catalyst consisting of finely divided metallic palladium on a support of gamma alumina at a temperature in range between 250° C. and 400° C.

Temperatures lower than 250° C. may be employed, but the reaction rate is then insufficient to permit continuous operation by passage over a catalyst bed. At about 380° C. small amounts of undesirable organic by-products tend to be formed and this tendency increases with temperature, although even at 400° C. the by-products relatively are of little importance. Accordingly, it is preferred to operate at a temperature in the region of 360° C. i.e., from about 320° C. to 370° C. in order to attain the maximum reaction rate compatible with the minimum production of unwanted side products.

The lower aliphatic olefins to which this reaction is applicable on the 1-olefins having from 2 to 4 carbon atoms i.e., ethylene, propylene, butene-1 and butadiene, of which ethylene is preferred.

The ratio of the reactants is relatively unimportant and an excess of hydrogen cyanide or of the olefin may be employed. In view of the toxic nature of hydrogen cyanide, it is generally preferred to operate with an excess of olefin, which may be readily separated from the less volatile nitrile reaction product and recycled. Impurities in the olefin such as saturated compounds do not affect the reaction.

The pressure at which the reaction is performed appears relatively unimportant. Sub-atmospheric pressure, atmospheric pressure or superatmospheric pressure may all be employed successfully in the reaction of this invention.

The catalyst employed in this invention is a conventional palladium on alumina catalyst which may be obtained as an article of commerce, and should preferably contain from about 0.01 to 5% by weight of metallic palladium on a porous gamma alumina support. Such catalyst may be made by impregnation of the catalyst support granules with a palladium salt and thereafter reducing the salt to the metal either by wet chemical methods or by firing at about 500° C. in a reducing atmosphere. In any event, the catalyst should be fired prior to use. The catalyst has excellent activity and a life of many hours depending on the feedstock. Eventually, the activity of the catalyst is reduced by carbonization but may be regenerated by firing to remove the carbon deposits.

This invention is further illustrated by the following example which should not, however, be construed as fully delineating the scope of this discovery.

*Example*

Ethylene gas was metered into a gas saturator containing liquid hydrogen cyanide, and the mixed gases were then passed over a 21.3 g. bed of catalyst consisting of 0.05% by weight of palladium on gamma alumina pellets contained in a 1" diameter hard glass tube with a ¼" (outside diameter) thermowell. The catalyst was maintained at a temperature of 360° C. as measured by a thermocouple placed in the thermowell. The contact time was about 2.5 seconds. During the experiment the products exit the reactor (all in the gaseous state) were analyzed continuously by gas chromatography in order to follow the conversion level and product distribution.

During a thirty-minute period when the system was at equilibrium, 3.5 liters of ethylene containing 2.05 g. of hydrogen cyanide were passed through the reactor. The products of the reaction were passed into a receiver which was coupled to a gas scrubber, where the off-gas (containing unreacted HCN, ethylene and ammonia) was scrubbed countercurrently with a mixture of 50 parts of toluene and 50 parts of acetic acid at 0° C. The off-gas was analyzed by gas chromatography for ethylene and traces of HCN which may have leaked through the scrubber. The scrubber solution was analyzed for propionitrile by gas chromatography. Hydrogen cyanide was determined by a standard silver nitrate titration, and ammonia was determined by titration with perchloric acid in methanol.

Found:

1.748 g. propionitrile (0.0318 mole)
0.040 mole hydrogen cyanide
0.0022 mole ammonia Thus, the conversion of hydrogen cyanide to propionitrile was 42%, and the yield of propionitrile based on hydrogen cyanide and recovered nitrogen containing products was 94%. The conversion of ethylene to propionitrile was 22%, while the yield based on ethylene was essentially quantitative.

Nitriles are well-known organic chemicals having a wide variety of uses as solvents and the like. They are important intermediates for the preparation of a broad spectrum of organic chemicals as described, for example, in the text "The Chemistry of Organic Cyanogen Compounds" by V. Migridichian, American Chemical Society Monograph No. 105, Reinhold Publishing Company, New York, 1947.

Many other modifications of this invention will be apparent to those skilled in the art.

I claim:

1. A method for the production of organic nitriles which comprises contacting a mixture of a lower aliphatic olefin and hydrogen cyanide with a catalyst consisting of finely divided metallic palladium on a gamma alumina catalyst support at a temperature in the range between 250° C. and 400° C. and thereafter recovering from the reaction product an organic nitrile resulting from the addition of the said hydrogen cyanide to the said lower aliphatic olefin.

2. The process of claim 1 in which the catalyst is heated to a temperature in the range between 320° C. and 370° C.

3. Process of claim 1 in which the said olefin is ethylene and the said organic nitrile is propionitrile.

4. Process of claim 2 in which the said olefin is ethylene and the said organic nitrile is propionitrile.

References Cited by the Examiner
UNITED STATES PATENTS

| | | | |
|---|---|---|---|
| 3,057,906 | 10/1962 | Fierce et al. | 260—465.3 |
| 3,062,860 | 11/1962 | Bloch | 260—465.3 |

CHARLES B. PARKER, *Primary Examiner.*

JOSEPH P. BRUST, *Examiner.*